United States Patent
Wen (10) Patent No.: US 6,424,371 B1
(45) Date of Patent: *Jul. 23, 2002

(54) INTELLIGENT VIDEO MONITOR SYSTEM

(76) Inventor: Sheree H. Wen, 796 Longhill Rd., Briarcliff Manor, NY (US) 10510

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,489

(22) Filed: Sep. 24, 1997

(51) Int. Cl.$^7$ ................................. H04N 7/18
(52) U.S. Cl. ........................... 348/153; 348/38
(58) Field of Search ................. 348/153, 14, 15, 348/159, 150, 38, 47, 207, 229, 345, 36

(56) References Cited

U.S. PATENT DOCUMENTS

| | | | | |
|---|---|---|---|---|
| D203,678 S | * | 2/1966 | Newton | D26/14 |
| 4,006,291 A | * | 2/1977 | Imsand | 348/55 |
| 5,023,725 A | * | 6/1991 | McCutchen | 348/38 |
| 5,027,104 A | * | 6/1991 | Reid | 348/153 |
| 5,270,811 A | * | 12/1993 | Ishibashi et al. | 348/143 |
| 5,272,525 A | * | 12/1993 | Borchardt et al. | 348/729 |
| 5,359,363 A | * | 10/1994 | Kuban et al. | 348/36 |
| 5,495,576 A | * | 2/1996 | Ritchey | 395/125 |
| 5,661,518 A | * | 8/1997 | Palm et al. | 348/42 |
| 5,703,604 A | * | 12/1997 | McCutchen | 348/36 |
| 5,725,062 A | * | 3/1998 | Fronek | 180/2.2 |
| 5,880,782 A | * | 3/1999 | Koyanagi et al. | 348/364 |
| 6,002,430 A | * | 12/1999 | McCall | 348/36 |

OTHER PUBLICATIONS

Homer L. Davidson, "Troubleshooting and Repairing Camcorders", McGraw–Hill, p. 88,89,242,244, 1996.*

* cited by examiner

Primary Examiner—Andy Rao
(74) Attorney, Agent, or Firm—Robert D. Katz; Cooper & Dunham, LLP (57) ABSTRACT

An intelligent video monitor system includes a video monitoring unit having a plurality of detectors arranged in an array for monitoring for an intrusion within a defined area. A plurality of video receiver units are dispersed with and arranged in an array along with the plurality of detectors for monitoring video within the defined area, each of the plurality of video receiver units arranged for monitoring a portion of the defined area. Processing and control circuitry processes outputs from the plurality of detectors and video receiver units and automatically selects at least one of the video receiver units based on the processed outputs and a wireless transmitter transmits the output from the automatically selected at least one video receiver unit. A wireless receiver unit receives the output signal transmitted by the transmitter. The receiver unit includes an antenna for receiving the signal output from the transmitter. A receiver demodulates the output signal received by the antenna to provide a demodulated received signal. A decoder decodes the demodulated received signal to provide at least one decoded signal and a display displays the at least one decoded signal.

22 Claims, 6 Drawing Sheets

INTELLIGENT VIDEO MONITOR SYSTEM

BACKGROUND OF THE INVENTION

1. Field of the Invention

The present invention relates to video monitor system and, more particularly, to an intelligent video monitor system.

2. Description of the Related Art

Various types of monitoring systems are known. For example, U.S. Pat. No. 4,777,526 relates to a security monitoring system designed to transmit signals from a plurality of video cameras via a common transmission line. Automatic recognition is provided for detecting substantial and noticeable movement within a picture derived from the video information from each of the video signal sources by comparing frames of video information. Each camera is connected to its own modulator and transmitter for wireless communication of the video signal to its own receiver circuit and frequency converter. Each video signal is then transmitted on a common transmission line with a different frequency. A tuner at the receiving end then selects the appropriate camera output by tuning to the appropriate frequency. However, this system discloses individual camera units with corresponding transmitting and receiving circuitry which can be costly and inefficient. In addition, since detection is performed at the receiving end of the system after the video signals have been transmitted wirelessly to the common transmission line, by monitoring the differential video output between successive video frames, the system is more prone to errors introduced into the video signals during transmission. Accordingly, the '526 patent incorporates additional circuitry in the receiver for avoiding false alarms.

Another system is disclosed in U.S. Pat. No. 5,398,057 and relates to a security and surveillance system. Detectors monitor zones of surveillance and generate activation signals in response to the detection of the intruder in each of the zones. A camera switcher switches between outputs from discreet cameras based on the outputs from the detectors. However, the '057 patent also discloses the use of discrete video camera units and therefor, is a very costly and bulky system to maintain and operate.

SUMMARY OF THE INVENTION

The present invention relates to an intelligent video monitor system. The system consists of a video monitoring unit including a plurality of detectors arranged in an array for monitoring for an intrusion within a defined area. A plurality of video receiver units are dispersed with and arranged in an array along with the plurality of detectors for monitoring video within the defined area, each of the plurality of video receiver units is arranged for monitoring a portion of the defined area. Processing and control circuitry processes outputs from the plurality of detectors and video receiver units and automatically selects at least one of the video receiver units based on the processed outputs. A wireless transmitter transmits the output from the automatically selected at least one video receiver unit. A wireless receiver system receives the output signal transmitted by the transmitter. The receiver system includes an antenna for receiving the signal output from the transmitter and a receiver for demodulating the output signal received by the antenna to provide a demodulated received signal. A decoder decodes the demodulated received signal to provide at least one decoded signal. A display displays the at least one decoded signal.

According to an embodiment of the present invention, the video monitoring unit is in a shape of a sphere or a hemisphere. The video receiver units and detectors are arranged in arrays around an outer circumference of the sphere or hemisphere. The plurality of detectors may consist of audio sensor units.

The processing and control circuitry receives as inputs, output signals from the detectors and video receiver units and processes the output signals and outputs at least one of an average audio signal, a total audio signal and a differential audio signal and at least one of an average video signal, a total video signal and a differential video signal. The differential video signal is derived by performing a comparison of time sequential images from the plurality of video receiver units. A sudden rise or lowering of the differential video signal is used as a trigger for controlling at least one of the focus, the tracking and the sensitivity of the video receiver units to light. The plurality of video receiver units are arranged such that the video monitoring unit is capable of monitoring 360 degrees in all directions.

The plurality of video sensor units can consist of micro element detector units sensitive to different wavelengths of light in the visible and infrared spectrums, such that when ambient light diminishes, power of the detector units in the array which are more sensitive to light can be controlled to detect motion and form a clear, crisp video image.

The transmitter and receiver unit can both be separate compact portable units so that the transmitter unit can be carried into position and left to monitor a desired area. The transmitter and receiver units can include a wireless communication system capable of operating, for example, in one of the 900 Mhz or higher frequency ranges including the and 1.4 and 1.5 Ghz frequency ranges.

BRIEF DESCRIPTION OF THE DRAWINGS

Descriptions of the preferred embodiments of the present invention will now be made by reference to the accompanying drawings in which.

DETAILED DESCRIPTION OF THE PREFERRED EMBODIMENTS

Figure 1:
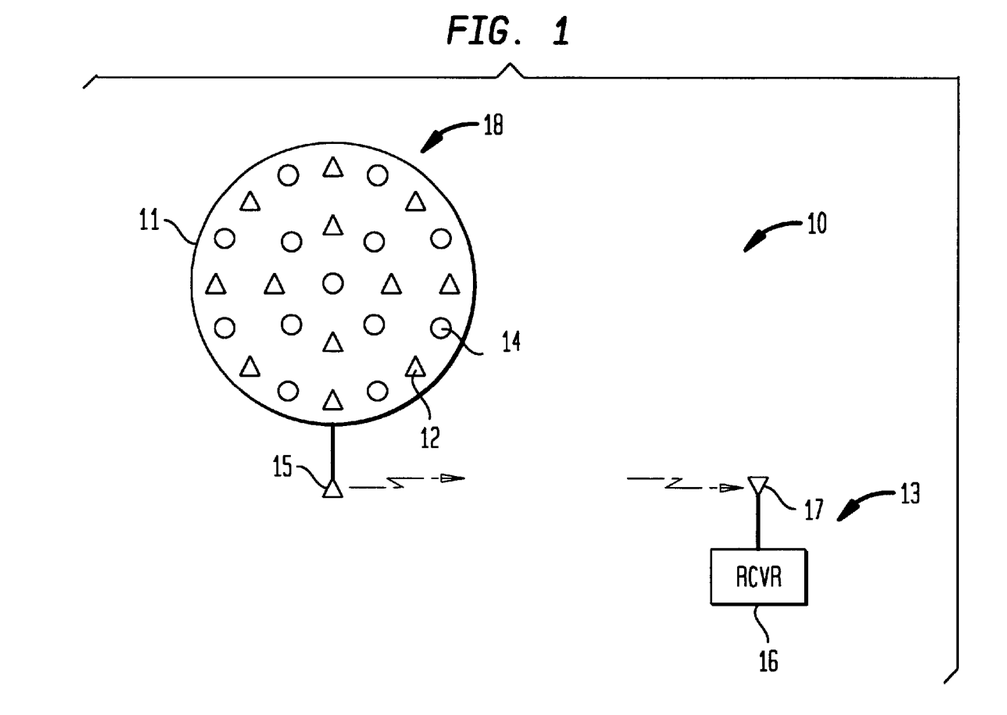
FIG. 1 is a view of a video monitor system according to an embodiment of the present invention.

The present invention relates to an intelligent video monitor system ideally suited for use as a video monitor system for monitoring remote locations. The intelligent video monitor system as shown in FIG. 1 is referred to generally as system 10 and includes a monitor/transmitter unit 18 and a receiver system 13. The monitor/transmitter unit 18 is a compact portable unit that can be easily carried into and left in an area to be monitored. The receiver system 13 is also a compact portable unit that can be carried by an operator and used to monitor video and audio signals received from the unit 18.

According to this embodiment of the present invention, monitor/transmitter unit 18 is a spherical or hemispherical body unit 11 having a plurality of video receiver units 12 and detectors 14 arranged thereon. Although not shown in FIG. 1, with reference to FIG. 2A, monitor/transmitter unit 18 also includes therein circuitry for processing video data and for controlling each of the elements in the unit. For example, monitor/transmitter unit 18 includes processor circuitry 22 for processing data from each of the video receiver units 12 and detectors 14 and for selecting one or more video receiver units 12 to output video data. Monitor/transmitter unit 18 also includes encoding circuitry 24 for encoding selected video data and transmitting circuitry 26 and an antenna 15 for transmitting the encoded video data.

Receiver system 13 includes a receiving unit 16 and a receiving antenna 17. Antenna 17 is impedance and frequency matched to receive the signal transmitted from the monitor/transmitter unit 18. As best shown in FIG. 2B, receiver system 13 includes a receiver 28 for amplifying and frequency down-converting the received signal. A decoder 27 is also provided for decoding the received output. A processor 29 processes the decoded data and a monitor 3 displays the video output. The receiving system 13 also includes an audio output capable of outputting audio data which, optionally, may be output from the monitor/transmitter unit 18.

Referring again to FIG. 1, the plurality of video receiver units 12 are arranged in an array 12a around spherical body unit 11. Interdispersed throughout the array of video receiver units 12 is an array 14a of detectors 14. Detectors 14 can be any type of detector suitable for detecting the general location of an undesirable presence. Preferably, sound detectors are used, although motion, infrared or microwave detectors may be suitable. As is well known in the art, by analyzing the outputs from an array of sound detectors it can be determined from which direction a sound is originating. This information can be used, for example, to determine when an intruder enters the area around the detector array and to determine from which direction the intruder is entering.

Monitor/transmitter unit 18 is capable of continuously monitoring an area for activity or an intrusion. Monitor/transmitter unit 18 is a self contained unit and therefore, is portable and capable of being deployed in a remote area. Since the unit 18 is intelligent, the unit can sense from which direction an intruder, for example, is arriving and automatically selects the appropriate video receiver unit 12 to view the intruder. The video signal from the selected video receiver unit 12 (and, optionally, an audio signal from one of audio receivers 14) can then be processed as necessary and transmitted to remote receiver system 13. Monitor/transmitter unit 18 can be powered by battery or by AC line power. In the alternative, the unit can be powered by solar power with battery backup.

Figure 2A:
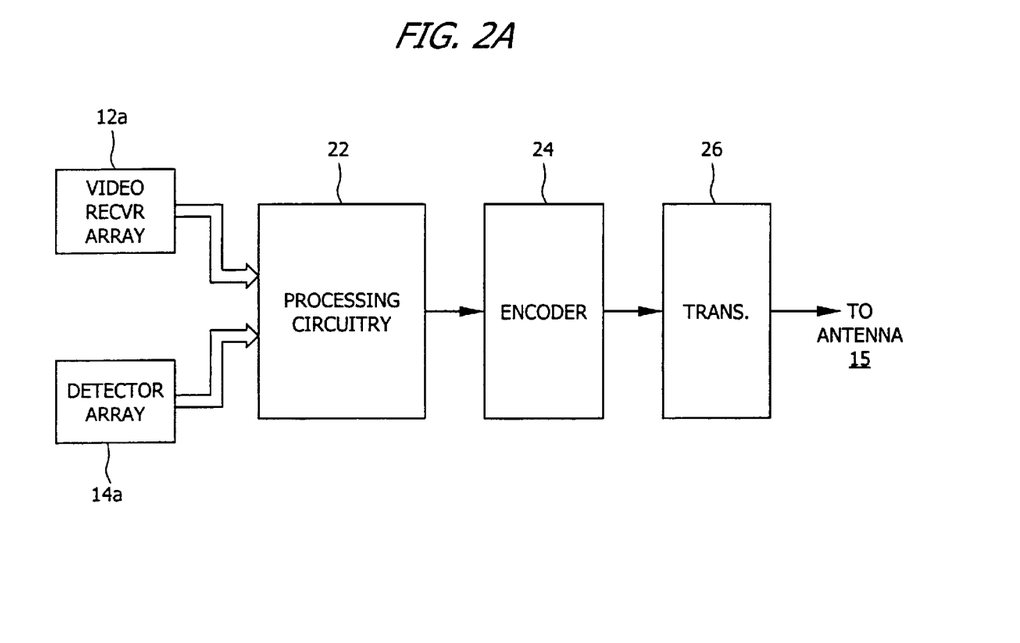
FIG. 2A is a block diagram of the video monitor/transmitter unit circuitry according to an embodiment of the present invention.
Figure 2B:
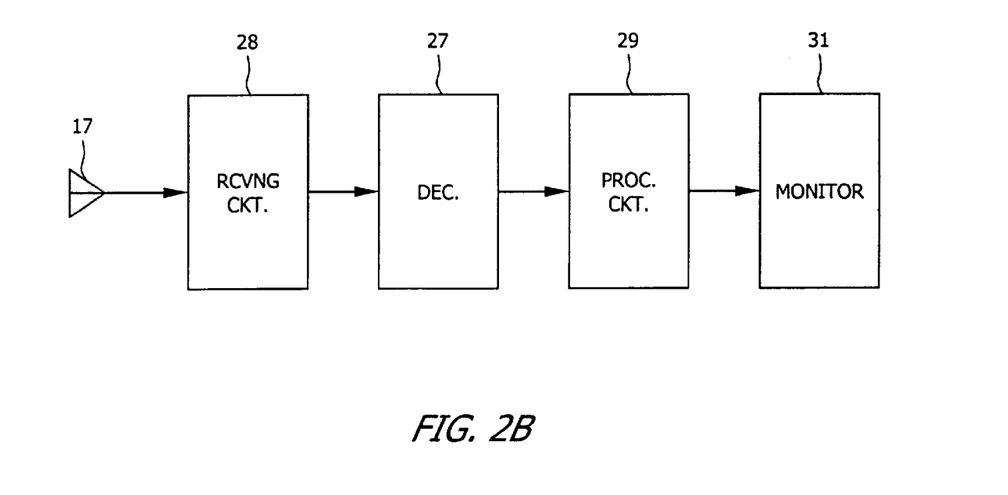
FIG. 2B is a block diagram of the receiver system circuitry according to an embodiment of the present invention.

A basic block diagram of the circuitry used for controlling monitor/transmitter unit 18 is shown in FIG. 2A. Monitor/transmitter unit 18 includes processing circuitry 22 which receives the outputs from the video receiver and detector arrays 12a and 14a, respectively. Although not shown, video receiver array 12a and detector array 14a may include analog and/or digital circuitry for conditioning, selecting and latching the outputs from each of the video receiver units 12 and detectors 14, respectively. Processing circuitry 22 can include one or more microprocessors, for example, and is capable of receiving the outputs from each of the video receiver units 12 and the detector units 14 and, based on that information, determine which one or more of the video receiver units to select for video output.

The information output from processing circuitry 22 (e.g., the selected video output) is input to encoder 24. Encoder 24 is capable of providing secure encryption to the processed video data information for providing end-to-end security. In addition, encoder 24 may also provide end-to-end error correction capabilities as desired. The encoded information is forwarded to transmitter 26. Transmitter 26 and antenna 15 are capable of frequency up-converting the encoded information and transmitting the information at frequencies allowed by the Federal Communications Commission. Typical frequency ranges include, for example, the 900 MHz personal communications frequency range or the 1.5 GHz frequency range. Transmitter 26 may also have circuitry capable of transmitting the audio and/or video signals directly to a television, a video cassette recorder or a PC video phone. In addition, the transmitter 26 is also capable of encoding the outputted signals with additional information including date, time, messages, image type enhancements, etc. In addition, although not shown, it may be desirable to provide optional video compression circuitry for compressing video data being transmitted. Various types of encoders, transmitters and compression circuits can be used and many types of theses circuits are well known in the art. Therefore, these elements will not be described in more detail.

Figure 3:
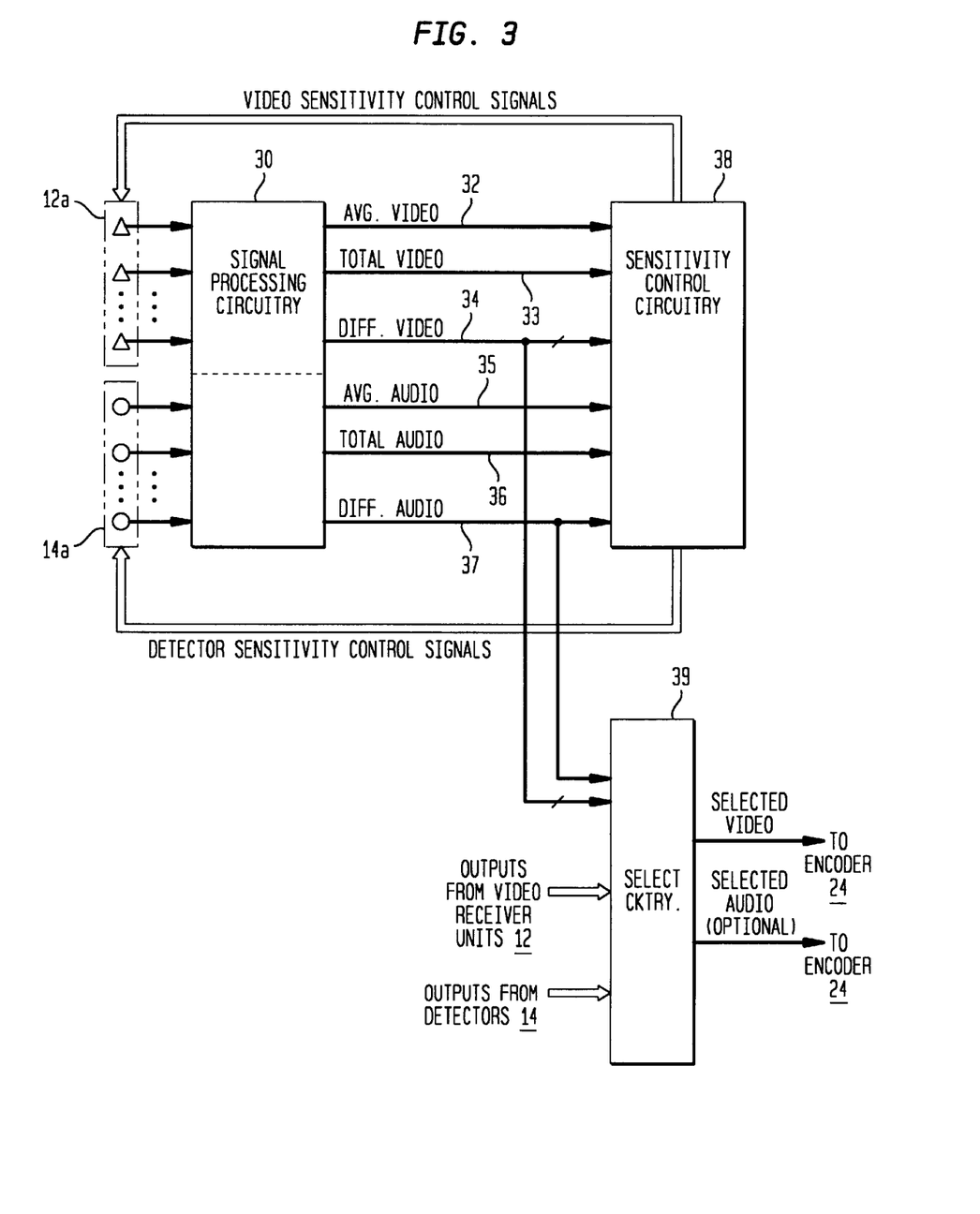
FIG. 3 is a block diagram of the processing circuitry according to an embodiment of the present invention.

Reference will now be made to FIG. 3 for a more detailed description of the present embodiment including processing circuitry 22. Video receiver units 12 can include one type or a combination of different types of optical receiving elements or micro element detector units for receiving either visible wavelengths of light or capable of operating in the infrared range. Each of the video receiving units may also include automatic gain control and automatic feedback loops, although not shown in the figures. According to a preferred embodiment of the present invention, video receiver units 12 may be charge coupled devices (CCDs) or an array of micro elements, for example, the outputs of which are input to processing circuitry 22. As shown, processing circuitry 22 includes signal processing circuit 30 which can be one or more microprocessor units, for example. The microprocessor unit or units include all necessary supporting circuitry including a central processing unit as well as all necessary memories, buffers, latches, etc. Signal processing circuit 30 processes the video signals output from video receiver units 12 to provide an average video output 32, a total video output 33 and a differential video output 34. The outputs from each video receiver unit can be processed individually in parallel or sequentially in a time sequenced manner. The average, total and differential video outputs are input to sensitivity control circuitry 38 to determine in a known manner the available amount of light. The sensitivity control circuitry 38 provides feedback to video receiver array 12a to control the sensitivity and/or focus of the video receiver units 12. When an insufficient amount of light is determined, an infrared detection mode can be selected and power of the detector units in the array which are more sensitive to light controlled to detect motion and provide a clear, crisp video image signal for output to the receiver unit.

Signal processing circuit 30 is also capable of determining motion by comparing a previous video frame with a current video frame for each video receiver unit 12. Signal processing circuit 30 is capable of sequentially performing such a function for each video receiver unit 12. In practice, signal processing circuit 30 compares luminance data of each pixel of a current frame with luminance data of the corresponding pixel in a stored previous frame. When a difference of the luminance data in the corresponding pixel is greater than a predetermined threshold value, the differential video signal output 34 outputs information to video selection circuitry 39 indicating which video receiver unit or units 12 sensed movement. To reduce the time necessary for monitoring each of the video receiver units 12, it is preferable to perform this comparison operation on only a limited number of pixels per video receiver unit 12.

Signal processing circuitry 30 performs similar functions on the audio signals from detectors 14. The outputs from each detector 14 can also be monitored individually in parallel or sequentially in a time sequenced manner. The total audio output, the average audio output and the differential audio output are also input to sensitivity control circuitry 38. In a known manner, sensitivity control circuitry 38 determines and controls the sensitivity of detectors 14 accordingly, thus compensating for excessive background noise, for example. Signal processing circuit 30 performs a differential comparison of sound level for each detector 14 by comparing a present sampled sound level with a previously stored sound level. Differential audio output line 37 outputs information indicating which detector or detectors 14 detected a significant change in noise level.

Video selection circuitry 39 inputs the differential audio and video information and selects an output from the array of video receiver units 12a accordingly. For example, if the differential audio and video information indicate motion in the same field of view or in the same general area, the video receiver unit 12 corresponding to that field of view is selected. If the differential audio and video information indicate motion in different areas, video selection circuitry 39 can toggle the selected output to view each of the fields of view corresponding to those areas. In this manner, processing circuitry 22 is capable of detecting movement and sound and select an appropriate video receiver unit 12 accordingly.

The present invention is also capable of providing three dimensional output images. For example, the outputs from a pair of video sensor elements 30 degrees apart (e.g., a right and a left eye view) may be simultaneously selected by selection circuitry 39. The outputs may then be combined in a well known manner at receiver system 13 to produce a three dimensional video image. The video outputs may be combined in the monitor/transmitter system 18 and then transmitted to the receiver system 13, separated and then used to generate a three dimensional image. In the alternative, each of the outputs may be transmitted separately and received by the receiver system 13 for processing. According to this embodiment of the present invention, the pair of video signals are transmitted using a time-division multiplexed system so that each signal is transmitted in a predefined time window. In the alternative, each signal can be transmitted using a different prescribed carrier frequency signal. The signals are received by receiver system 13, and then combined in a known manner to produce a three dimensional video output.

Referring to FIG. 2B, receiving antenna 17 is paired with transmitting antenna 15 for providing maximum signal transfer efficiency. Antenna 17 preferably is a high gain antenna and may include preprocessing amplification circuitry for example. Receiving circuit 28 receives the output from antenna 17 and amplifies and conditions the received signals. Receiving circuit 28 also separates the signals as appropriate. For example, if two video signals are transmitted from unit 18 for three dimensional video, if each of the signals from the video sensor units is transmitted at a different frequency or at a different time, receiver 28 will separate and down-convert the received signals as appropriate. The down-converted signals are then forwarded to decoder unit 27 for decoding. Decoder 27 can decode the signal if the signal was encoded for end-to-end security and can perform error correction if necessary. In addition, decoder 27 can decode the three dimensional frames of left and right video information for interlaced display on monitor 31. The left and right images may be displayed with short display with intercept pictures or with interlaced addressing lines The decoded signals, which can include audio and/or one or more video signals are then forwarded to processing circuit 29. Processing circuit 29 performs video signal processing and audio signal processing on the received audio and video signals and outputs the signals to monitor 31. Monitor 31 can, of course, include user controls for controlling the displayed image as is well known in the art. Monitor 31 may also include a speaker output for outputting audio. Monitor 31 is preferably a liquid crystal display capable of displaying interlaced video. Receiver system 13 is preferably a portable device and is powered by battery, AC input or solar power with battery backup.

The present invention thus provides for automatic and continuous activity or intrusion detection and automatically adjusts itself according to varying light conditions and can operate even in light conditions under one lux. The system can be used to automatically focus and track movement within the field of view by selecting the appropriate optical receiver unit or units 12.

Figure 4:
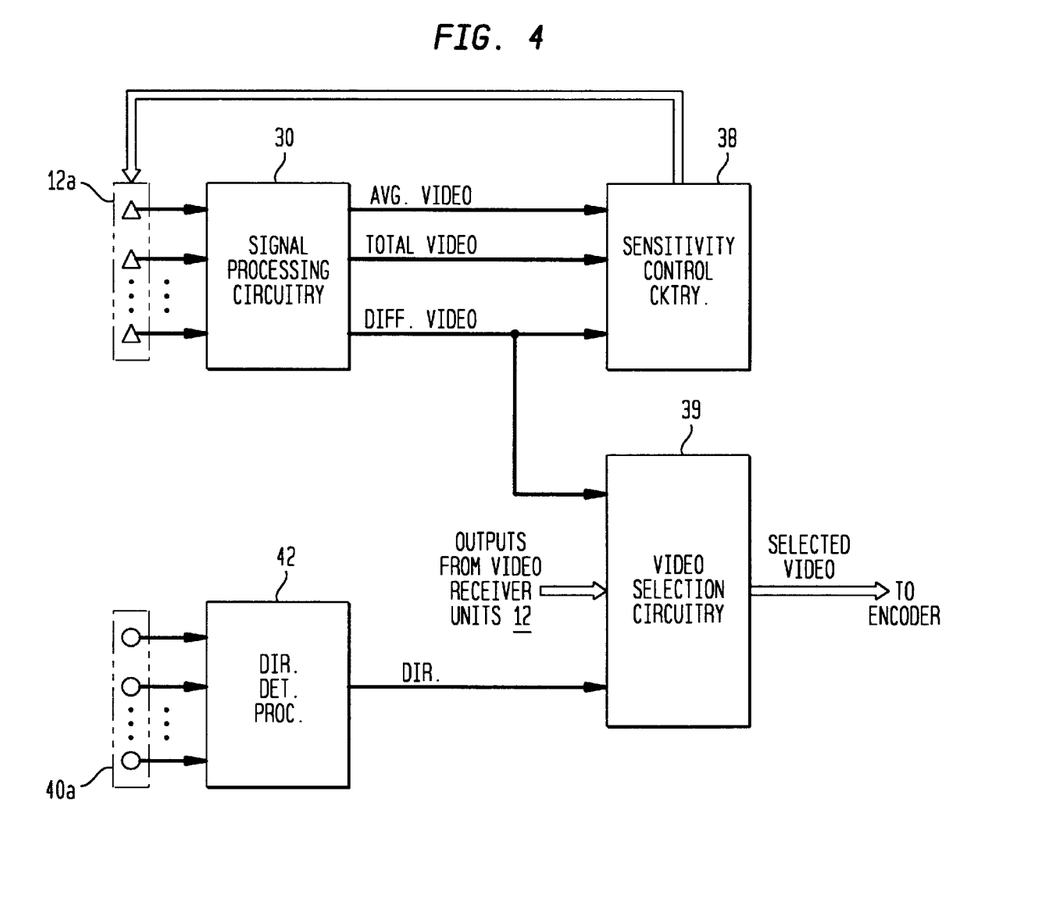
FIG. 4 is a block diagram of the processing circuitry according to another embodiment of the present invention.

According to another embodiment of the present invention as shown in FIG. 4, motion detectors 40 are used to determine the direction from which an intrusion is occurring. For example, various types of motion detectors including infrared and microwave detectors can be used. The motion detectors 40 are arranged in an array similar to detectors 14 in the previous embodiment. The outputs of motion detectors 40 are input to direction detection processor 42. Processor 42 is capable of analyzing the outputs of motion detectors 40 to determine the direction in which an intrusion is occurring. Direction detection processor 42 is capable of tracking movement by continuously monitoring the outputs from motion detectors 40. A direction signal DIR is input to and used by video selection circuitry 39 along with the differential video output signal from signal processing circuitry 30 to select the appropriate video output. This embodiment requires less signal processing capabilities than the previously described embodiment, since significantly less processing time and power is required to track motion than it is to track sound using an array of detectors.

Monitor transmitter unit 18 can be arranged in different configurations as desired. Preferably any such configuration of monitor/transmitter unit 18 is capable of providing fields of view 360 degrees in any direction around the unit. Monitor/transmitter unit 18 can be arranged in the form of an inverted triangle, a cube or a cone, for example, including video receiver units 12 and detectors 14 provided on the faces thereof.

Figure 5:
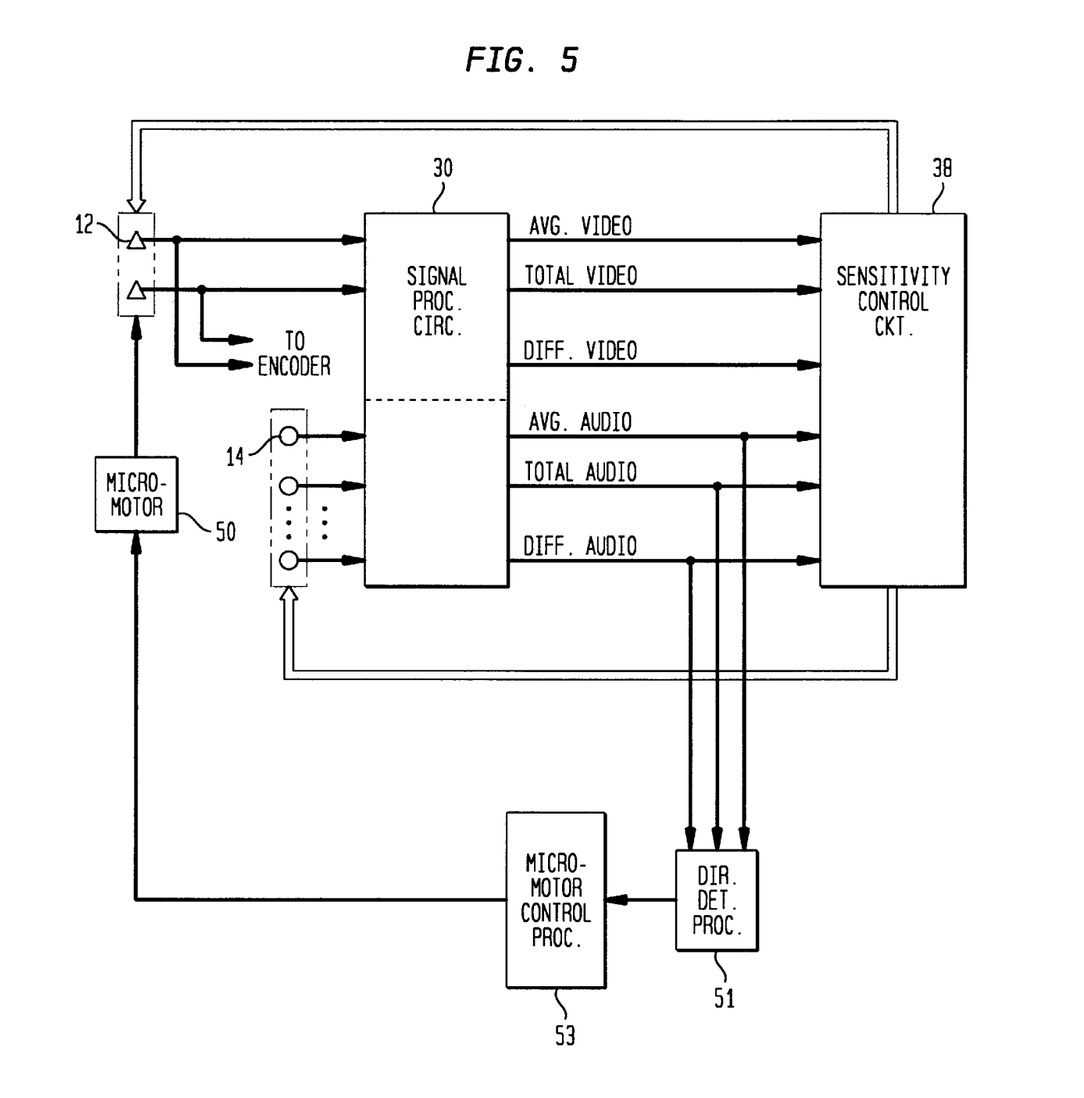
FIG. 5 is a block diagram of the processing circuitry according to yet another embodiment of the present invention.

In an alternative embodiment, in order to minimize the number of video receiver units necessary and thus keep the cost of monitor/transmitter unit 18 to a minimum, it may be preferable to provide only one optical receiver unit 12 which is capable of being moved in any desired direction. For example, an optical receiver unit 12 can be mounted on a movable chassis which is capable of being moved in 360 degrees in any direction by one or more micro-motors. Detectors are provided around the periphery of the unit. Audio outputs from the detectors can be processed by processing circuitry as described above to automatically control the direction of movement of the optical receiver unit by controlling the micro-motors as necessary. According to this embodiment of the present invention as shown in FIG. 5, the outputs from detectors 14 are used to determine from which direction an intrusion is occurring. That is, the outputs from detectors 14 (e.g., audio detector outputs) are input to signal processing circuitry 30. One or more of the average, total and differential audio outputs from circuitry 30 are input to direction detection processor 51 which determines, based on these inputs, the direction of the intrusion. Processor 53 outputs control information to micro-motor control processor 53 which controls micro-motor 50 to move the video receiver unit into proper position to view the intruder.

Figure 6:
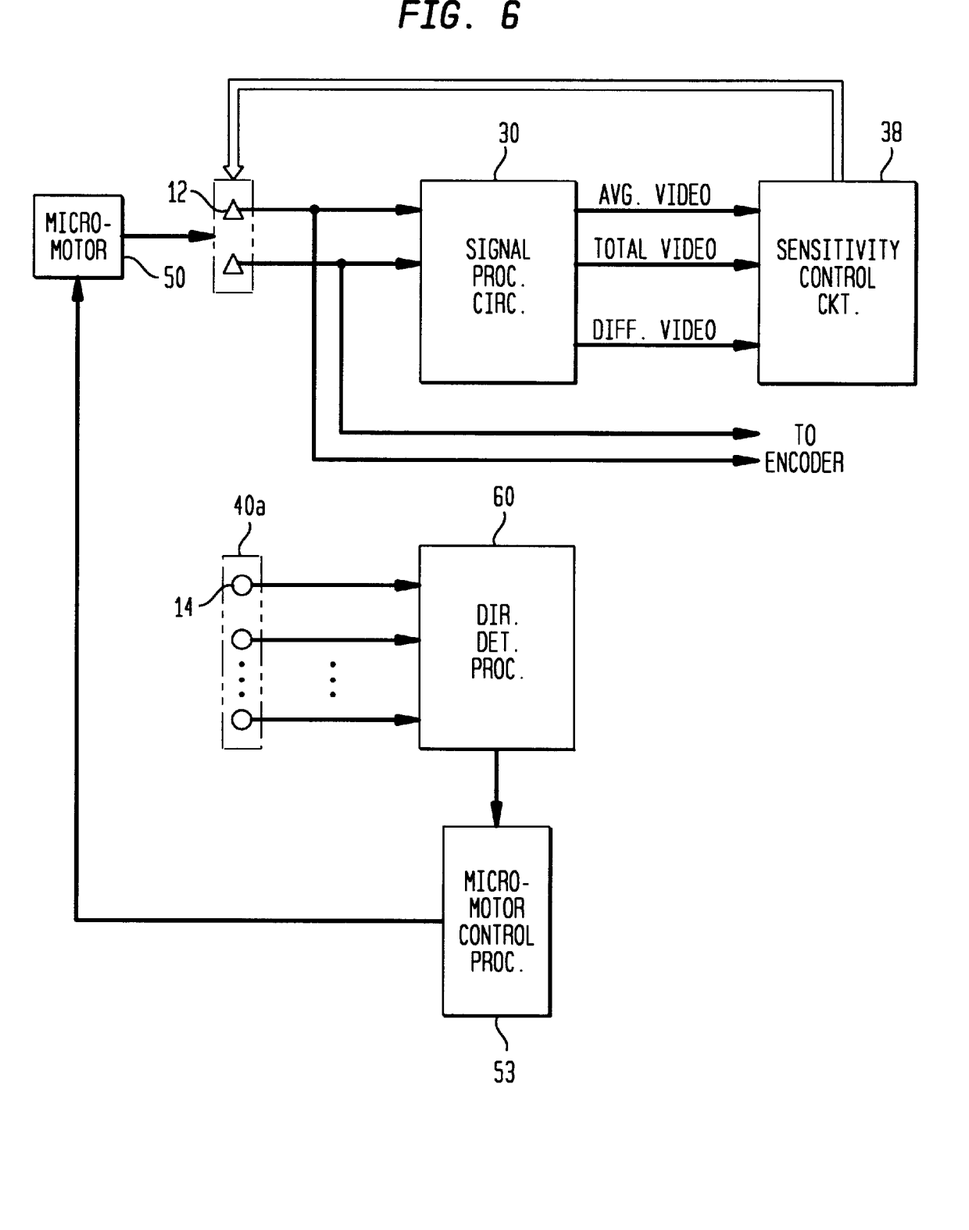
FIG. 6 is a block diagram of the processing circuitry according to still another embodiment of the present invention.

As shown in FIG. 6, motion detector array 40 is provided for determining the direction from which an intrusion is occurring. The outputs of motion detectors 40 are input to direction detection processor 60 which determines based on these inputs the direction of the intrusion. Direction information is then input to micro-motor control processor 53 which controls micro-motor 50 accordingly. Video receiver unit 12 is thus moved into proper position to view the correct field of view.

Of course, in order to provide three dimensional capabilities, a pair of video receiver units 12 may be mounted 30 degrees apart on the movable chassis. The outputs from the pair of video receiver units can then be transmitted to receiver system 13 for three dimensional video processing.

Although the present invention has been described and illustrated in detail, it is clearly understood that the same is by way of illustration and example only and is not to be taken by way of limitation, the spirit and scope of the present invention being limited only by the terms by the appended claims.

What is claimed is:

1. An intelligent video monitor system comprising:
   a video monitoring unit for providing surveillance of a defined area and detecting an intruder in a region within said defined area, comprising:
      a plurality of detectors arranged in an array to monitor said defined area and detect movement by said intruder into said region,
      a plurality of video receiver units dispersed with and arranged in an array along with the plurality of detectors to monitor the defined area, each of the plurality of video receiver units being arranged to monitor a portion of the defined area,
      processing and control circuitry adapted to centrally process outputs from the plurality of detectors and outputs from the video receiver units, and automatically determine based on the processed outputs a direction of said movement by said intruder within said region, track said movement and select at least one of the video receiver units based on the tracked movement, and
      a wireless transmitter adapted to transmit the output from the automatically selected at least one video receiver unit,
   wherein the video monitoring unit is arranged in a shape of one of a sphere and hemisphere, with the plurality of detectors and plurality of video receiver units being provided around the outer circumference to provide a field of view of 360 degrees in at least one direction around the video monitoring unit, and the video monitoring unit being a compact self sufficient portable unit; and
   a wireless receiver unit adapted to receive the output signal transmitted by the transmitter, said receiver unit comprising:
      an antenna adapted to receive the signal output from the transmitter,
      a receiver adapted to demodulate the output signal received by the antenna to provide a demodulated received signal,
      a decoder adapted to decode the demodulated received signal to provide at least one decoded signal, and
      a display adapted to display the at least one decoded signal.

2. An intelligent video monitor system as recited in claim 1, wherein said plurality of detectors comprise audio sensor units.

3. An intelligent video monitor system as recited in claim 2, wherein said processing and control circuitry receives as inputs, output signals from the detectors and video receiver units, and wherein said processing and control circuitry processes the output signals and outputs at least one of an average audio signal, a total audio signal and a differential audio signal and at least one of an average video signal, a total video signal and a differential video signal.

4. An intelligent video monitor system as recited in claim 3, wherein the differential video signal is derived by performing a comparison of time sequential images from the plurality of video receiver units.

5. An intelligent video monitor system as recited in claim 3, wherein a sudden rise or lowering of the differential video signal is used as a trigger for controlling at least one of the focus, the tracking and the sensitivity of the video receiver units to light.

6. An intelligent video monitor system as recited in claim 1, wherein the plurality of video receiver units are arranged such that the video monitoring unit can monitor 360 degrees in all directions.

7. An intelligent video monitor system as recited in claim 1, wherein said video receiver units are selected to automatically adjust to varying light conditions.

8. An intelligent video monitor system as recited in claim 1, wherein said processing and control circuitry operates in real time and automatically selects the video receiver units to automatically track an object moving within the defined area.

9. An intelligent video monitor system as recited in claim 1, wherein said video monitoring unit is controlled to automatically control focusing and tracking of each video receiver unit in parallel or in a time sequenced manner.

10. An intelligent video monitor system as recited in claim 1, wherein outputs from a pair of video receiver units which are arranged in the array 30 degrees apart from each other are simultaneously selected to be transmitted, to provide a three dimensional video output.

11. An intelligent video monitor system as recited in claim 10, wherein the pair of video receiver unit outputs are each transmitted at a different time using a time-division multiplexing method.

12. An intelligent video monitor system as recited in claim 10, wherein the pair of video receiver unit outputs are transmitted at different carrier frequencies within a specified frequency band.

13. An intelligent video monitor system as recited in claim 1, wherein the plurality of video receiver units comprise an array of micro elements sensitive to different wavelengths of light in the visible and infrared spectrums.

14. An intelligent video monitor system as recited in claim 13, wherein when ambient light diminishes, a sensitivity of the array of micro elements is controlled accordingly.

15. An intelligent video monitor system as recited in claim 1, wherein the transmitter and receiver unit comprise a wireless communication system.

16. An intelligent video monitor system as recited in claim 12, wherein the wireless communication system operates in one of the 900 Mhz and 1.4 Ghz frequency ranges.

17. An intelligent video monitor system as recited in claim 1, wherein the transmitter transmits directly to one or more of a television, a VCR and a PC video phone.

18. An intelligent video monitor system as recited in claim 1, wherein the video monitoring unit is battery powered.

19. An intelligent video monitor system as recited in claim 1, wherein the video monitoring unit is powered by solar power with battery backup.

20. An intelligent video monitor system as recited in claim 1, wherein the transmitter encodes outputted data with at least one of date, time, messages, error correction codes, image type enhancements and encryption.

21. An intelligent video monitor system, as recited in claim 1, wherein said video monitoring unit is in a shape of one of a hemisphere and a sphere.

22. An intelligent video monitoring unit for providing surveillance of a defined area and detecting an intruder in a region within said defined area, comprising:
    a plurality of detectors arranged in an array to monitor said defined area and detect movement by said intruder into said region;
    a plurality of video receiver units dispersed with and arranged in an array along with the plurality of detectors to monitor the defined area, each of the plurality of video receiver units being arranged to monitor a portion of the defined area;
    processing and control circuitry adapted to centrally process outputs from the plurality of detectors and outputs from the video receiver units, and automatically determine based on the processed outputs a direction of said movement by said intruder within said region, track said movement and select at least one of the video receiver units based on the tracked movement; and
    a wireless transmitter adapted to transmit the output from the automatically selected at least one video receiver unit,
    wherein the video monitoring unit is arranged in a shape of one of a sphere and hemisphere, with the plurality of detectors and plurality of video receiver units being provided around the outer circumference to provide a field of view of 360 degrees in at least one direction around the video monitoring unit, and the video monitoring unit being a compact self sufficient portable unit.

* * * * *